US009246546B2

(12) United States Patent
Croot

(10) Patent No.: US 9,246,546 B2
(45) Date of Patent: Jan. 26, 2016

(54) DIGITAL SUBSCRIBER LINE MANAGEMENT USING VIRTUAL NOISE CALCULATION

(71) Applicant: BRITISH TELECOMMUNICATIONS PUBLIC LIMITED COMPANY, London (GB)

(72) Inventor: Christopher Marcus Croot, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/347,558

(22) PCT Filed: Sep. 28, 2012

(86) PCT No.: PCT/GB2012/000747
§ 371 (c)(1),
(2) Date: Mar. 26, 2014

(87) PCT Pub. No.: WO2013/045879
PCT Pub. Date: Apr. 4, 2013

(65) Prior Publication Data
US 2014/0233724 A1    Aug. 21, 2014

(30) Foreign Application Priority Data

Sep. 30, 2011 (EP) .................................... 11250832

(51) Int. Cl.
*H04B 3/32* (2006.01)
*H04M 3/34* (2006.01)
*H04J 3/10* (2006.01)

(52) U.S. Cl.
CPC ... *H04B 3/32* (2013.01); *H04J 3/10* (2013.01); *H04M 3/34* (2013.01)

(58) Field of Classification Search
None
See application file for complete search history.

(56) References Cited

U.S. PATENT DOCUMENTS

2008/0031313 A1*  2/2008  Oksman ......................... 375/222
2010/0014645 A1*  1/2010  Feng et al. ................. 379/27.01
2010/0254442 A1  10/2010  Cendrillon
(Continued)

FOREIGN PATENT DOCUMENTS

WO    WO 2007/012867        2/2007
WO    WO 2007/012869        2/2007
WO    WO 2010/112809 A1    10/2010

OTHER PUBLICATIONS

International Telecommunication Union, Series G: Transmission Systems and Media, Digital Systems and Networks, *Asymmetric Digital Subscriber Line Transceivers 2(ADSL2): Amendment 3: Scale Factor for Downstream Transmitter Referred Virtual Noise and Corrigenda*. G.992.3 (2009), pp. 1-20.
(Continued)

*Primary Examiner* — Fan Tsang
*Assistant Examiner* — Jeffrey Lytle
(74) *Attorney, Agent, or Firm* — Patterson Thuente Pedersen, P.A.

(57) ABSTRACT

A digital subscriber line management system is provided. It comprises a device for calculating a set of values specifying a virtual noise mask. The device includes a receiver for receiving or otherwise obtaining a set of measurements of noise levels experienced at a digital subscriber line transceiver at each of a plurality of frequencies at different times, and a processor for calculating, in respect of each frequency, a combined value based on a plurality of measurements taken at different times, and for generating the set of values specifying a virtual noise mask in dependence upon the combined values.

9 Claims, 3 Drawing Sheets

(56) References Cited

U.S. PATENT DOCUMENTS

2010/0296648 A1* 11/2010 Fang et al. .................... 379/417
2011/0206101 A1* 8/2011 Matza et al. .................. 375/222

OTHER PUBLICATIONS

International Telecommunication Union, Series G: Transmission Systems and Media, Digital Systems and Networks, Digital sections and digital line system—Access networks, *Asymmetric Digital Subscriber Line Transceivers 2(ADSL2)*: G.992.3 (Apr. 2009), pp. 1-404.

Palshikar, Girish Keshav, *Simple Algorithms for Peak Detection in Time Series*, Tata Research Development and Design Centre (TRDDC), as available at http:www.tcs-trddc.com/trddc_website/pdf/SRL/Palshikar_SAPDTS_2009.pdf.

* cited by examiner

DIGITAL SUBSCRIBER LINE MANAGEMENT USING VIRTUAL NOISE CALCULATION

PRIORITY CLAIM

The present application is a National Phase entry of PCT Application No. PCT/GB2012/000747, filed Sep. 28, 2012, which claims priority from EP Patent Application No. 11250832.0, filed Sep. 30, 2011, said applications being hereby incorporated by reference herein in their entireties.

TECHNICAL FIELD

Embodiments relate to Digital Subscriber Line (DSL) management and especially management of high bandwidth DSL types such as high speed Asynchronous DSL (ADSL) and Very high speed Digital Subscriber Line (VDSL).

BACKGROUND

DSL systems which operate at very high bandwidths tend to do so by employing higher frequency portions of the spectrum which becomes more feasible as the length of each line shortens (as fiber is pushed further towards the edges of the access network—e.g. Fiber to the Cabinet (FttC) and Fiber to the Drop Point (FttDP). Unfortunately, at these much higher frequencies cross talk from neighboring lines operating at the same high frequencies becomes more of a problem.

The latest version of ADSL (e.g. as specified in the ITU standard G992.3) provides for low power modes when a line is not transmitting or receiving data and it is expected that such low power modes will be introduced into the VDSL standard at some point before too long. A particular problem of cross noise when a system has low power modes is that the level of cross talk noise will vary significantly when a neighboring line is in a low power mode, compared to when it is in a high power mode and actively transmitting and/or receiving data.

When a DSL line synchronizes up (i.e. a connection is set up across the line between the two DSL transceivers at each end of the line—this process is also known as resynching and retraining) a measurement of the noise is taken and is used to set certain parameters which are then used throughout the connection until a new connection is established (i.e. until the line re-synchs). The most important parameter which is set is the target signal to noise ratio margin (target SNM), which in turn causes the line to synchronize at a particular rate for the given noise detected at each carrier frequency. Once a connection has synchronized at a particular line rate, it will endeavor to maintain that line rate for the duration of the connection. If the noise experienced by the line becomes too great to sustain the line rate at which the line synchronized, the connection will fail and the DSL transceivers will lose synchronization with each other. At this point the line will automatically resynch—quite possibly at a lower line rate if the noise which caused the resynch is still present while the line is resynching.

As noted above, the use of low power modes can cause the noise environment of a DSL line to change dramatically over time. For example, if a first line runs adjacent to second line (e.g. in a bundle of lines running together towards and indeed to a common network-side DSL transceiver (e.g. in a Digital Subscriber Line Access Module (DSLAM)) and if the first line synchronizes at a time when the second line is operating in a low power mode it may experience a relatively mild or noiseless noise environment (compared to what it would have been if the second line were operating in a high power mode) and may consequently synchronize at a fairly high line rate for a given SNM. If at a subsequent time the second line then "wakes up" and goes into a high power mode, the affect on the noise environment of the first line may be such that it can no longer sustain the line rate at which it originally synched and so cause the first line to drop out.

To address the above prospective problem it has been proposed to use a feature called "virtual noise". As specified in for example ITU's standards G.992.3 (ADSL 2) and G993.2 (VDSL2) the virtual noise is represented as a set of break points and is either sent from one transceiver to another or read by a transceiver from a local Management Information Base (MIB) at the time of setting up a connection. Generally, the connection comprises two transceivers or modems, referred to hereinafter as a Transceiver Unit-User-side (TU-U) and a Transceiver Unit-Network-side (TU-N), and a twisted copper pair between them.

[Note on terminology: in G992.3 the modems are referred to as an ATU-R (standing for ADSL Transceiver Unit-Remote (i.e. at the user's end)) and an ATU-C (for ADSL Transceiver unit-Central office (at the Central Office or Exchange side), whilst in G993.2 (VDSL 2) they are referred to as a VTU-R and a VTU-O (for VDSL Transceiver Unit-central Office). In the present specification they shall be referred to as a Transceiver Unit-User-side (TU-U) and a Transceiver Unit-Network-side (TU-N) but these correspond to the ATU-R and ATU-C of G992.3 and the VTU-R and VTU-O of G993.2 respectively.]

The range of frequencies at which the TU's may communicate over the connection is generally specified by a standard which is applicable to a certain geographical region as well as being governed by the capabilities of the TU's and the standard to which they are operating (e.g. G992.3 or G993.2, etc.). Within this range there are allocated one or more upstream bands and one or more downstream bands. In each upstream band the TU-U (e.g. ATU-R, VTU-R) will transmit signals and the TU-N (e.g. ATU-C, VTU-O) will receive signals. Correspondingly in each downstream band the TU-N (e.g. ATU-C, VTU-O) will transmit signals and the TU-U will receive signals.

During synchronization a series of test signals are transmitted by both transceivers and there is also a quiet line phase when no signals are transmitted by either TU. During this time each TU measures/estimates the noise detected on its respective receive bands (e.g. the TU-U measures noise on the downstream bands while the TU-N measures noise on the upstream bands) for each tone/sub-carrier frequency in the respective band and then reports an indication of this detected/measured noise estimation to the other TU. Each TU then tries (in a rate adaptive system) to determine an overall data rate (which it is reasonable to suppose is sustainable for the duration of the connection) and a bit allocation for each bin/tone/sub-carrier frequency (which allocation may change to take into account variations in the channel or the noise etc. over the duration of the connection) based at least partially on this information. If a virtual noise scheme is being used, the appropriate virtual noise specified for the respective band in question is additionally taken into account when determining a bit allocation for each bin/tone/sub-carrier frequency.

Although the standards specify details of how the virtual noise should be expressed (e.g. as a set of break points with virtual noise for tones/bins not corresponding to a break point being obtained by linear interpolation between the values of break points on either side of the respective bin/tone), no methodology for setting the virtual noise in the first place is provided in the standards since this is a matter which can be determined on a vendor by vendor basis and does not therefore need to form part of the standards.

US 2010/0254442 describes a method of selecting a virtual noise mask for use in training a pair of cooperating DSL modems. The noise mask is selected from one of a set of predetermined templates each of which has a similar pattern or profile across the range of frequencies (used by the modems) but a differing magnitude. (The pattern or profile itself seems to be based on a Power Spectral Density (PSD) mask specified by a band plan or a standard or something similar specified by a National or Regional authority.) The exact template to select is determined based on a series of measurements of the Signal to Noise Ratio (SNR) over a period of time and may be based on an average of such measurements or an average plus some standard deviation or on some rolling aggregation of all such measurements (e.g. of the (VALUEnew=alpha times VALUEold+beta times MEASUREMENT) where alpha plus beta equals one and MEASUREMENT is the most current SNR measurement). It is not described what happens on the very first occasion that a device, but the teaching seems to be that thereafter a number of measurements will have been taken (including several measurements taken during the showtime of the connection) such that for all subsequent synchronizations a virtual noise template will be selected for use in the synchronization process. The patent teaches away from using quiet line noise measurements taken during a synchronization or training phase since it appears to be believed that this may not capture the noise as well as SNR measurements taken during showtime of a connection. There is no teaching that unless a minimum number of quiet line noise measurements are taken for a line per unit of time, no virtual noise mask is generated for the line. Rather the teaching is that a virtual noise mask is always selected without any dependency upon the number of times that a connection resynchronizes per unit of time.

Furthermore, US 2010/0254442 does not teach a method of selecting which tones to use as break points in the virtual noise mask. As mentioned above, the patent teaches merely selecting from one of a finite number of virtual noise templates which it would seem all use the same predetermined tones for the break points with merely different magnitudes of the break points to generate similarly shaped but differently scaled versions of the common template. Thus there is no suggestion of analyzing the detected noise over the full range of available tones and selecting certain of those tones to use as the break points based on that analysis.

SUMMARY OF THE INVENTION

According to a first aspect, there is provided a method of calculating a set of values specifying a virtual noise mask, the method comprising the steps of measuring noise levels experienced at a Digital Subscriber Line, DSL, transceiver connected via a copper pair to a cooperating DSL transceiver to form a DSL connection between the transceivers, the noise levels being measured at each of a plurality of frequencies and at each of a plurality of times, and for each frequency calculating a combined value based on a plurality of measurements taken at different times, and generating the set of values specifying a virtual noise mask in dependence upon the combined values.

Alternatively, there is provided a method of calculating a set of values specifying a virtual noise mask, the method comprising the steps of receiving a plurality of measurements of noise levels experienced at a DSL transceiver at each of a plurality of frequencies at different times, and for each frequency calculating a combined value based on a plurality of measurements taken at different times, and generating the set of values specifying a virtual noise mask in dependence upon the combined values.

In one embodiment, the method further includes using the virtual noise mask specified by the calculated set of values in a synchronization or retraining phase between the transceivers.

The method may additionally comprise storing a plurality of measurements for use in performing the calculation of combined values.

In one embodiment, each noise level measurement is a measurement taken during a quiet line phase of a synchronization of the line. In many DSL transceivers, such a measurement is already taken and then stored as a set of breakpoints (see for example G.993.2 section 12.4.2.1.1 message field 13—the quiet line noise mask). In one embodiment, such information is sent from the respective transceiver to a central management device in a manner as described in co-pending published PCT patent application no. WO 2010/112809, which is incorporated herein by reference, such that the quiet line noise data is only collected after a resynch has occurred once a predetermined period (of, for example about 2 minutes) has expired such that such data is generally transmitted to the central management device only once a stable connection has been established.

A benefit of only collecting noise measurements after a re-synch and of basing a virtual noise mask on a combination of a plurality of measurements (and therefore of not calculating a virtual noise mask until at least a predetermined number of measurements have been obtained) is that virtual masks are only generated for lines which are retraining from time to time since there is no need to set a virtual noise mask for lines which are not re-synchronizing and for which accordingly it is at least very likely that the quiet line noise value (or the noise environment generally) is not changing. Thus in a preferred embodiment, unless a minimum number of quiet line noise measurements are taken for a line per unit of time (e.g. per week or per month), then no virtual noise mask is generated for the line. In one embodiment, the predetermined number of resynchronizations required to cause a virtual noise mask to be used in a resynchronization is at least 3 and most preferably is at least 5.

In one embodiment, the combined value is an xth percentile value of the plurality of values. For example in an embodiment, the $90^{th}$ percentile value of a plurality of values for a given line and tone is taken, for example, by considering the ten most recent measurement values and selecting the second largest value. In one embodiment, the percentile value selected is greater than the 50% percentile value but less than the $100^{th}$ percentile value. In one embodiment, the second highest value could be used regardless of how many such values are available to be "combined" provided it exceeds some predetermined number (although clearly there must be at least two numbers for the second greatest number to be selected).

Where the number of breakpoints collected for the quiet line noise mask is greater than the number of breakpoints required for the virtual noise mask (see note below), a peak detection algorithm is used to identify a number of peaks within the combined values generated from the quiet line noise mask breakpoints and these identified peak values of the combined values (or a selection of these) are used as the break points for the virtual noise mask. If it is required to make a selection of peak values (because more peak values are identified by the peak detection algorithm than can be provided within the allowed number of breakpoints for the virtual noise mask) then this may be done by either determining the most significant of the peaks based on a metric such as the gradient (or maximum gradient) of the peak, or else by selecting the peaks which result in the least error or difference between the quiet line noise mask and a reconstruction of that mask based on linear interpolation between the selected peaks. Instead of looking for an absolute error or difference, only non-conservative errors (i.e. where the actual quiet line noise value exceeds the value at that tone generated by linear interpolation of selected virtual noise break points) could be considered if a conservative virtual noise mask is required.

(NB. as an example, in current versions of the G.993.2 "VDSL2" standard, quiet line noise PSD's are given as 512 breakpoints (out of up to about 4,000 possible tones shared between upstream and downstream) per stream (i.e. 512 breakpoints for the upstream QLN as measured by the VTU-O and 512 breakpoints for the downstream QLN as measured by the VTU-R) whereas the virtual noise mask should comprise no more than 32 breakpoints per stream.)

In one embodiment, the noise measurements (e.g. the quiet line noise mask) are transmitted to a central management device which then generates the appropriate set of values specifying a virtual noise mask thus relieving the transceiver units of the need to perform such calculations themselves. However, in alternative embodiments the calculations could be performed by the transceiver units themselves.

In one embodiment, the method is used in conjunction with crosstalk cancellation techniques (such as, for example, DSL vectoring as set out in ITU-T recommendation G.993.5) since when cross talk cancellation techniques are employed more fluctuating noise (which would have been masked/obscured by the much more significant cross talk noise if no cross talk cancellation techniques were being employed) is exposed and therefore accurate calculation and application of virtual noise becomes more important.

According to a second aspect, there is provided a device for calculating a set of values specifying a virtual noise mask, the device including a receiver for receiving a set of measurements of noise levels experienced at a DSL transceiver at each of a plurality of frequencies at each of a plurality of times, and a processor for calculating, in respect of each frequency, a combined value based on a plurality of measurements taken at different times, and for generating the set of values specifying a virtual noise mask in dependence upon the combined values.

According to a third aspect, there is provided a digital subscriber line transceiver for communicating with an associated transceiver over an electrical line when in use, the transceiver comprising a measurement device for measuring noise levels experienced at the transceiver at each of a plurality of frequencies at different times, and a processor for calculating, in respect of each frequency, a combined value based on a plurality of measurements taken at different times, and for generating a set of values specifying a virtual noise mask in dependence upon the combined values and a transmitter for transmitting the set of values specifying a virtual noise mask to the associated transceiver when in use.

Further aspects relate to processor implementable instructions for carrying out the method of the first aspect of the present invention and preferred features thereof and to a carrier medium, most preferably a tangible carrier medium such as a magnetic or optical disk or a solid state storage device, etc., carrying such processor implementable instructions, preferably in a non-transient manner.

BRIEF DESCRIPTION OF THE DRAWINGS

In order that the present invention may be better understood, embodiments thereof will now be described, with reference to the accompanying drawings in which.

DETAILED DESCRIPTION OF EMBODIMENTS

One embodiment described below uses a management device 100 to perform two principal functions—Broadband Remote Access Server (BRAS) provisioning and Dynamic Line Management (DLM). The BRAS provisioning is not relevant to the present application and is therefore not described any further here but it is described in detail in co-pending International patent applications WO2007/012869 and WO2007/012867, for readers interested in the particulars of the preferred methods of BRAS provisioning applicable to the main embodiment.

As for the DLM function, this is desirable in the main embodiment because the downstream and upstream speeds of the DSL connections controlled by the management device of the main embodiment rate adapt to the highest speeds the line can support. As the DSL connections are running at their maximum limits they are more susceptible to noise which can cause errors and spontaneous resynchronizations (re-synchs).

In overview, the role of the DLM function of the management device is to ensure that the DSL connections provide a good compromise between the stability of the line and the performance of the line in terms of bit rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to increase or decrease the noise margins (i.e. the SNR margins) and/or interleave levels as required by setting a new profile for each ADSL connection (using the existing provisioning systems for setting profiles at DSLAMs). In addition, in the present embodiment, the management device additionally operates to generate virtual noise masks in respect of at least some of the DSL transceivers associated with the DSL connections which can be used by the DSL transceivers to determine bit rates which are more sustainable in view of fluctuating noise environments so as to improve the stability of such lines and tend to reduce their propensity to suffer resynchs, without unduly reducing the bit rates to overly conservatively low bit rates.

Figure 1:
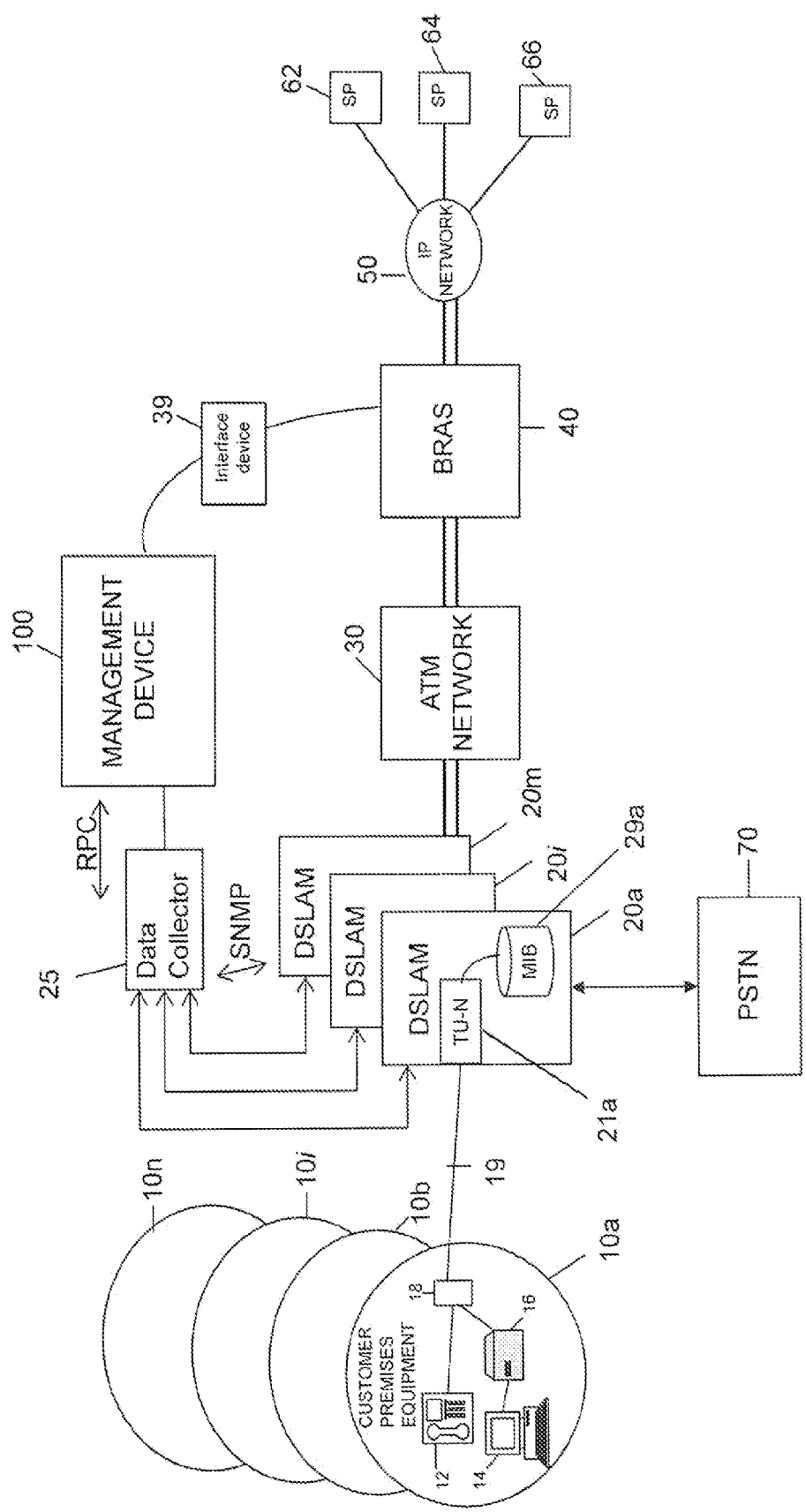
FIG. 1 is a schematic block diagram illustrating a telecommunications network incorporating a management device operating in accordance with a method according to an embodiment.

Referring to FIG. 1, a first embodiment is illustrated in overview. A copper pair loop 19 (which forms part of the access network which extends between customer premises equipment 10a, 10b, ... 10i ... 10n and a BRAS 40) connects customer premises equipment 10a to DSLAM 20a (which is of course just one of many DSLAMs 20a, ... 20i, ... 20m located within the access network and each of which connects to a number of the CPE's 10a, 10b, ..., 10i, ..., 10n). In the present embodiment, DSLAM 10a is located within one of a number of local exchanges (also known as central offices in the US). Clearly, a single CPE generally connects only to a single DSLAM and a single DSLAM typically connects to many CPE's; in a typical access network there may be many millions of such CPE's and many thousands, or tens of thousands of DSLAM's or other aggregation devices containing VTU-O's—e.g. Multiple Service Access Nodes (MSAN's) or mini-DSLAMs, etc.

In alternative embodiments (especially those pertinent to VDSL) the DSLAMs may be located in locations closer to the end user than an exchange or central office, such as in a cabinet or at a drop point etc. The DSLAM (in the present embodiment) separates normal voice traffic and data traffic and sends the voice traffic to the Public Switched Telephone Network (PSTN) 70 (however in alternative embodiments especially those employing VDSL and fiber to the cabinet or drop point etc. the voice traffic may be VOIP data traffic and not separated at this stage—or an analogue telephone adapter may be collocated with the DSLAM at, for example, a street cabinet or a drop point, and used to convert POTS signals from a normal telephone located at the customer's premises into VOIP at that location for onward forwarding as VOIP over an optical fiber connection from the DSLAM to an exchange building—or, finally, a splitter could split out the POTS signals from the broadband at the location of the DSLAM (e.g. cabinet or drop point) and carry the POTS signals to an exchange over a legacy copper pair whilst broadband signals are decoded at the DSLAM and sent to the exchange via an optical fiber). Each of the DSLAMs 20 includes a number of network-side DSL transceiver units TU-N's 21a each of which terminates, at the network end, a DSL connection (to an end-user side DSL transceiver TU-U 16). The DSLAM 20a also includes a Management Information Base 29a which stores certain parameters used by the TU-Ns within the DSLAM. The data traffic is passed on from the DSLAM 20 in the present embodiment through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an end user DSL modem TU-R 16 and a computer 14.

The present embodiment additionally includes a data collector 25 which collects data from and disseminates data to the DSLAM's 20, to and from a management device 100 which communicates with both the DSLAMs 20 (via the data collector 25) and the BRAS 40 (note although only a single BRAS 40 is shown in practice there are likely to be many such BRAS devices). The operation of the management device 100 as regards its calculation of a virtual noise mask is explained in greater detail below with reference to FIGS. 2 and 3. However, in overview it obtains information from the DSLAM 20 about the rate at which each Digital Subscriber Line (DSL) connects to the DSLAM and information about events such as detected errors and/or re-synchs occurring on the line/connection and measured noise levels (e.g. a quiet line noise function as specified in G993.2 section 12.4.2.1.1 message field 13) and modifies the operation of the BRAS device 40, the DSLAMs 20 and the end user modems 16 (via the DSLAMs) as regards the profile applied to a BRAS 40, the profiles used by respective TU's for a respective DSL connection and, via the virtual noise masks, the bit rates adopted by the TU's for a given profile and measured channel conditions.

Figure 2:
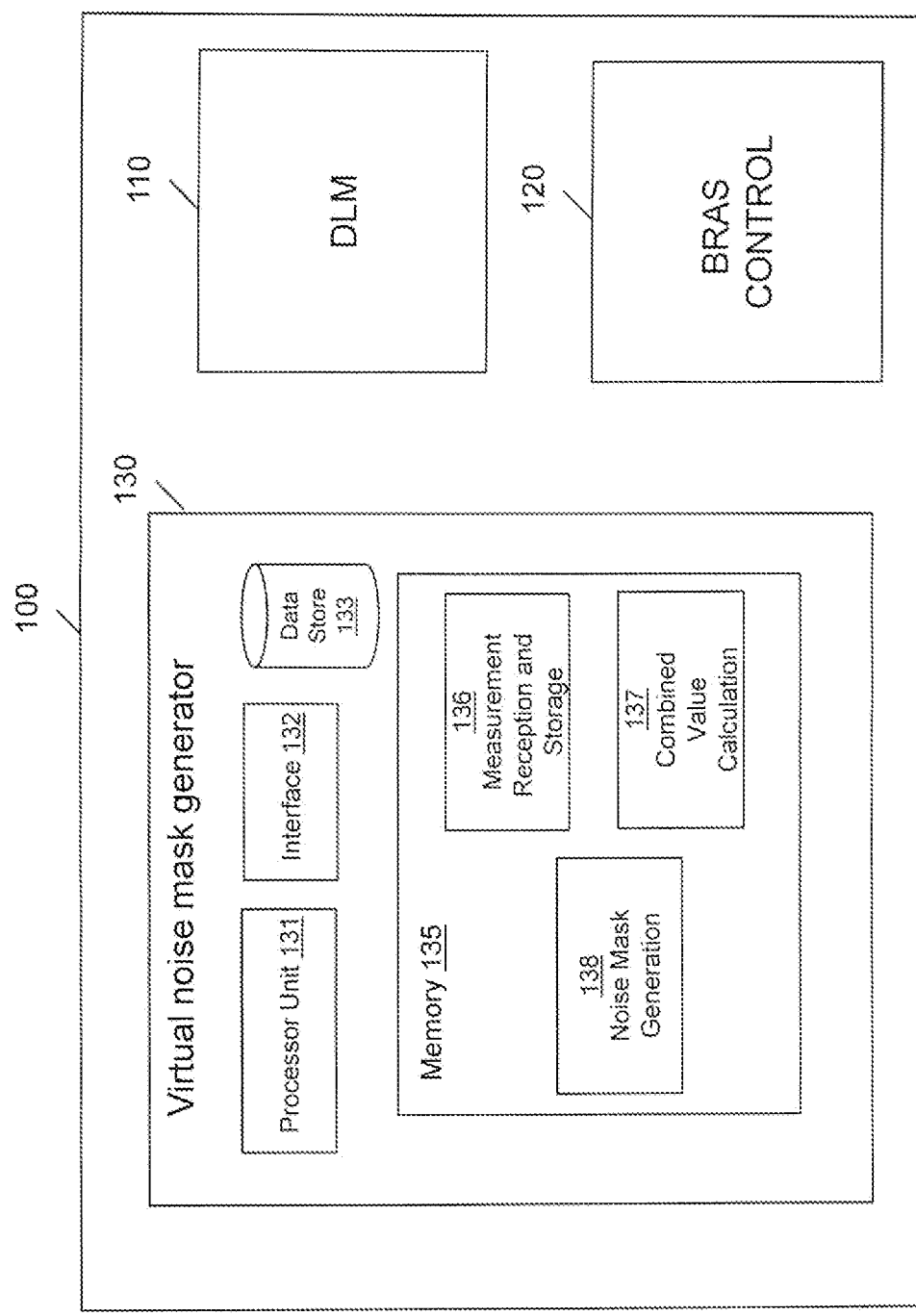
FIG. 2 is a schematic block diagram illustrating the management device of FIG. 1.

As shown in FIG. 2, the management device 100 comprises three main functional parts: a Dynamic Line Management (DLM) function 110, a BRAS provisioning or BRAS control function 120 and a virtual noise mask generator function 130.

The DLM function 110 is mainly responsible for selecting a suitable profile on which to place each DSL connection which it manages. The profile determines parameters such as target SNM, interleave depth, etc.

The BRAS control function 120 is mainly responsible for ensuring that the BRAS is provisioned at an appropriate rate for each connection with which a particular BRAS is associated to try to prevent situations where downstream data is sent to a connection at a rate which exceeds the rate at which that connection can carry downstream data. Precise details of some of the algorithms which may be used by the BRAS Control function 120 of the management device 100 to calculate a consistent rate in embodiments are described in International applications WO2007/012869 and WO2007/012867, which are incorporated herein by reference in their entireties.

Embodiments, however, concerned with the virtual noise mask generator function 130. As shown in FIG. 2, this includes a processor unit 131, an interface 132 a data store 133 and a memory 135. The memory 135 stores various sets of code for causing the processor 131 to carry out certain functions when executing the code as set out below. In particular, the memory 135 stores a set of measurement reception and storage code 136 for controlling the reception and storage (within the data store 133) of measurement data received from DSLAMs 20; a set of combined value calculation code 137 for calculating a combined values from a plurality of different measurement values; and a set of noise mask generation code 138 for generating a set of values specifying a virtual noise mask in dependence upon the combined values calculated under the control of the combined value calculation code 137.

Under the control of the above mentioned three sets of code 136, 137 and 138, the virtual noise mask generator 130 performs the following: a) when a set of noise measurement data (in particular in the present embodiments quiet line noise function data in the form of a set of break point values) is received it stores these in the data store 133 (code set 136) together with a date stamp. It also periodically flushes out old data which exceeds a predetermined staleness period of one month in the present embodiment (code set 136). When a predetermined number of measurements at different times for a particular connection have been received and stored, a combined value is generated in the present embodiment by determining and selecting the $2^{nd}$ largest measurement value stored in the store 133 and this is also stored in the data store 133 (code set 137). Finally a set of break points (i.e. individual values which the noise mask should take at specified break point frequencies) is calculated. In one embodiment this is done by running a peak detection algorithm such as, for example, any of the peak detection algorithms specified in the paper "Simple Algorithms for Peak Detection in Time-Series" by Girish Keshav Palshikar of Tata Research Development and Design Centre (TRDDC) 54B Hadapsar Industrial Estate Pune 411013, India and currently available at the following URL and incorporated by reference herein in its entirety:
http://www.tes-trddc.com/trddc_website/pdf/SRL/Palshikar_SAPDTS_2009.pdf
on the combined values and then checking to see if the number of peak break points identified by the peak detection algorithm equals the number of required break points (as specified by the standard to which the TU for which the mask is intended is operating) minus two since the first and last (by frequency) combined values are specified as the first and last break points of the set of virtual noise mask break points respectively. If so the process is completed and the virtual noise mask break points are then transmitted via the data collector 25 to the respective DSLAM either to store in the MIB 29 for use by a TU-N in that DSLAM or for onward transmission to a TU-U connected to that DSLAM depending upon which TU the virtual noise mask is for. If the number of peak break points identified by the peak detection algorithm is greater than the number of break points required for the virtual noise mask, then a selection is made from the identified peak points based on the gradient of the peaks measured within a window of a predetermined number of quiet line noise measurement breakpoints such as ten points centered about the peak point. If fewer peaks are identified than are required for the virtual noise mask, then additional breakpoints are identified from the combined values as necessary (chosen by spreading the additional break points uniformly throughout the frequency band covered by the noise mask).

Figure 3:
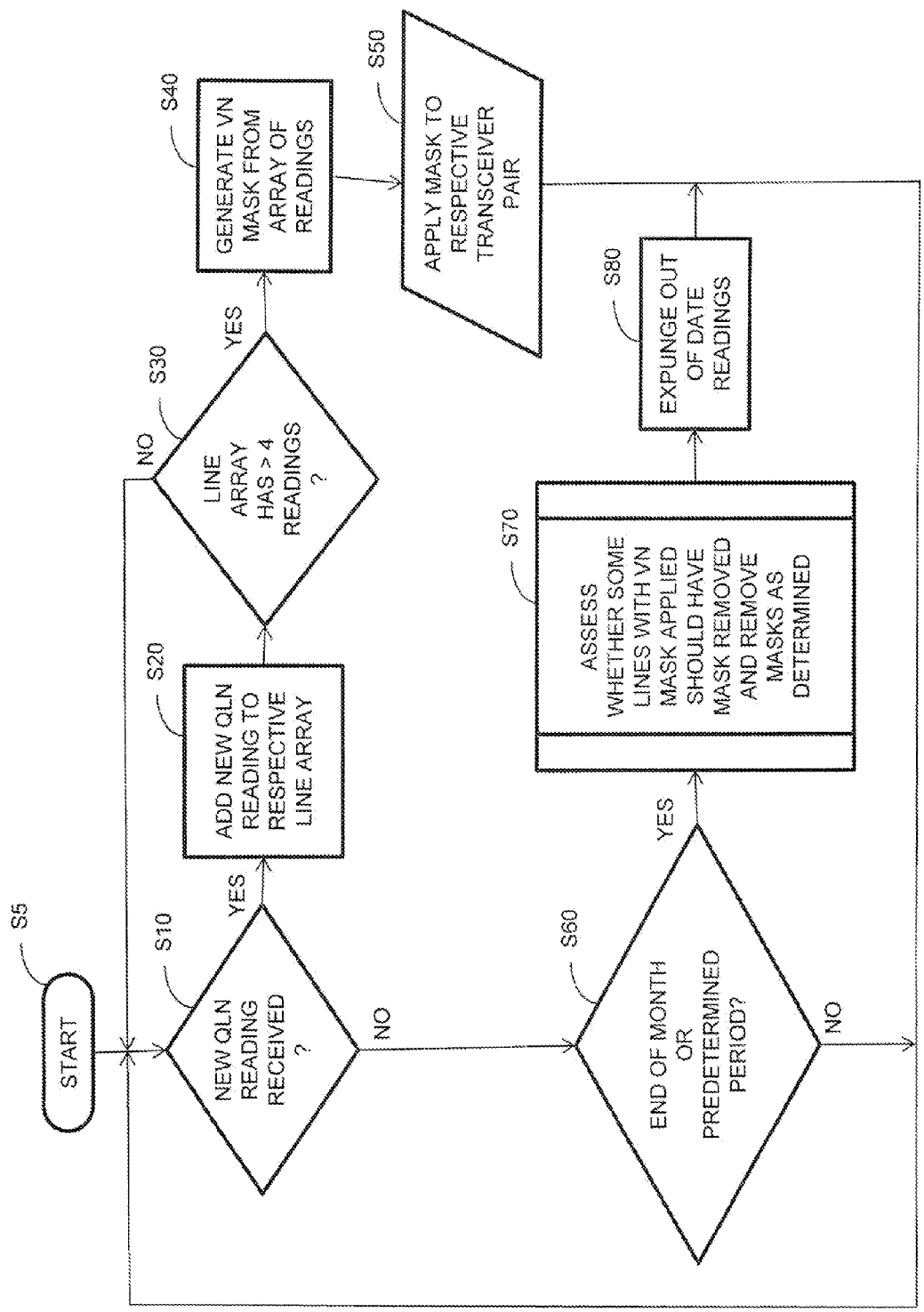
FIG. 3 is a schematic flow chart illustrating the principal steps performed by the management device of FIG. 2 when carrying out a method in accordance with an embodiment.

FIG. 3 is a flowchart illustrating the above-described method as performed by management device 100 in one embodiment. The method commences at S5 and proceeds to S10. At S10 it is checked to see if a new QLN reading has been received. If it has not the method proceeds to S60, but if a new reading has been received the method proceeds to S20.

At S20 the newly received Quiet Line Noise (QLN) reading is added to an array of such readings for the respective line (and stream direction—i.e. upstream or downstream) associated with the reading and then the method proceeds to S30.

At S30 it is determined if the newly added to array contains more than a predetermined number of readings (set to 4 in one embodiment). If it does not the method loops back to S10. If the array does contain more than the predetermined number of readings, then the method proceeds to S40.

At S40 a Virtual Noise Mask is generated from the array of readings in the manner already described above (e.g. an averaged QLN mask is formed by taking the second highest value from each of the readings at each break point in the QLN readings, and then a smaller number of these are selected to form the break points (e.g. 32 break points) of the VN mask by using a peak detection algorithm, or a similar algorithm which chooses a set of break points such that a straight line interpolation between the break points is always equal to or greater than the break point values of the averaged QLN mask). Alternative methods of forming an averaged QLN mask could be used in this step. If the method of keeping only two values per QLN break point is employed, clearly a counter should be maintained of the number of readings which have been received in a predetermined period (and this should be updated at S20); then at S30, instead of simply measuring the number of readings stored in the array, the value of the counter should be examined instead.

Upon completion of S40 the method proceeds to S50 in which the VN mask generated in S40 is applied to the respective modem of the respective DSL connection (e.g. an upstream VN mask is provided to the DSLAM/TU-N/other aggregation device for transmission by the TU-N to the TU-R during the next synchronization/training phase, whilst a downstream VN mask is provided to a MIB associated with the TU-N for application by the TU-N during the next synchronization/training phase).

Upon completion of step S50 the method returns to S10.

If at S10 it is determined that no new QLN reading has been received, the method proceeds to S60 in which it is determined if the end of the month (or some other predetermined period of time) has been reached. If it has not, then the method returns to S10, otherwise the method proceeds to S70.

At S70, a general assessment is made as to whether or not there are any lines to which a VN mask is currently being applied and which should have the VN mask removed, and any lines assessed positively in this way duly have the VN mask removed. Generally, if a line that was retraining stops retraining after training up with a VN mask it is a good indication that the VN mask is being useful in helping the line to remain stable. However, from time to time it is probably a good idea to check if the VN mask is still required as it may be that the noise which was originally causing the problem has now disappeared permanently, thus if the line is determined as behaving very stably for a certain minimum period of time (e.g. for 3 months) then it may be desirable to try removing the VN mask and seeing if it can now remain stable without the use of the VN mask. In the present embodiment this is done by noting in respect of each line a time at which a new VN mask was applied to it and comparing that time with the current time and if it is determined that more than 3 months has elapsed the mask is removed.

In the present embodiment, the method then simply continues after removing any VN mask (by proceeding to S80 described below and then back to S10) with the expectation that if the VN mask is still required to maintain the line stable, the process will soon ensure that a new VN mask is applied to the line and it should soon return to stability; an alternative embodiment might however choose to speed up this process by immediately re-applying the previous mask if a retrain occurs within some specified minimum period of time (e.g. 5 minutes), after resynchronizing without the application of a VN mask.

At S80 out of date readings in all of the arrays of QLN readings are expunged. In the present embodiment, this is done by including a timestamp with each reading contained within an array and comparing each timestamp with the current time and deleting any readings which are thus determined to be older than one month. Of course alternative methods could be used to perform such expunging of old readings and different periods (e.g. of two months, etc.) could also be used in such methods.

Upon completion of S80, the method returns to S10 and the method repeats indefinitely.

In an alternative embodiment, instead of storing all received measurement values, the virtual noise mask generator could operate approximately as follows: the first received set of measurements is simply stored as normal. When a second set of measurements is received it is processed (code set 137) to determine which of the stored and newly received measurements for each frequency is greater and the two values are stored in order. A record is also kept of the number of sets of measurements received and this is incremented to 2 and the date stamps of the sets of measurements are stored (code set 136). Whenever a subsequent set of measurements is received it is processed to identify if for each frequency the new measurement is less than the stored second measurement (if so it is discarded), greater than the stored second measurement but less than the stored greatest measurement (stored second measurement is discarded and replaced by the new value) or greater than the stored greatest measurement value (second stored value is discarded and replaced by the former stored greatest value while the new value is stored as the new greatest value). Once the predetermined number of new measurement sets have been received within the predetermined period of one month, the stored second value is determined as being the combined value and a virtual noise mask is generated from the stored second values (as the combined values).

Other similar embodiments for processing the measurement data to generate virtual noise mask breakpoint sets of values will be apparent to persons skilled in the art.

In alternative embodiments the calculation of virtual noise mask break point sets could be carried out within a DSLAM and or within an end user modem, however for ease of incorporation into a network it is preferred if it is done in a central management device as described in the above embodiments. Alternatively, it could be carried out in a special purpose processing device collocated with the DSLAM or other aggregation device terminating DSL connections from CPE DSL modems within a street cabinet or at a drop point.

In alternative embodiments it can be advantageous if the DSL transceivers are operating in accordance with a DSL standard such as G 993.2 or other standards which permit much higher frequencies to be used as sub-carrier frequencies since noise is more problematic at such high frequencies and so the benefits of the present invention will be correspondingly greater. This is especially so where cross-talk cancellation techniques such as vectoring are employed.

The invention claimed is:

1. A method of calculating a set of values specifying a virtual noise mask, the method comprising:
receiving a plurality of measurements of noise levels experienced at a digital subscriber line transceiver at each of a plurality of frequencies at different times, and for each frequency calculating a combined value based on a plurality of measurements taken at different times; and
generating the set of values specifying a virtual noise mask in dependence upon the combined values, wherein the virtual noise mask specified by the calculated values is applied to a digital subscriber line connection associated with the transceiver at which the measured noise levels were experienced for use in a subsequent resynchronization of the transceivers of the connection, wherein such a mask is only applied in the event that more than a predetermined number of resynchronizations greater than two have occurred on that line within a predetermined period of time.

2. A method according to claim 1, wherein each noise level measurement is a measurement taken during a quiet line phase of a synchronization of the line.

3. A method according to claim 1, wherein the values specifying a virtual noise mask are breakpoints and the measurements are also breakpoints, and wherein the number of virtual noise mask breakpoints is smaller than the number of measurement breakpoints, and wherein a peak detection algorithm is used to identify a number of peaks within the calculated combined values and these, or a selection of these, are used as the virtual noise mask breakpoints.

4. A method according to claim 3, wherein if the identified number of peaks exceeds the number required to obtain an appropriate set of break points for the virtual noise mask, a selection of the required number is made from the identified peaks by identifying the peaks having the greatest gradients.

5. Non-transitory computer readable medium for storing processor implementable instructions for causing a processor to carry out the method of claim 1 during execution of the instructions.

6. Non-transitory carrier means carrying the processor implementable instructions of claim 5.

7. A device for calculating a set of values specifying a virtual noise mask, the device comprising:
a receiver for receiving or otherwise obtaining a set of measurements of noise levels experienced at a digital subscriber line transceiver at each of a plurality of frequencies at different times;
a processor for calculating, in respect of each frequency, a combined value based on a plurality of measurements taken at different times, and for generating the set of values specifying a virtual noise mask in dependence upon the combined values; and
a transmitter for transmitting the virtual noise mask specified by the calculated values to a digital subscriber line connection associated with the transceiver at which the measured noise levels were experienced for use by the digital subscriber line transceiver in a subsequent resynchronization of the digital subscriber line transceivers of the connection, wherein such a mask is only applied in the event that more than a predetermined number of resynchronizations greater than two have occurred on that line within a predetermined period of time.

8. A device according to claim 7, wherein the device is additionally operable as a digital subscriber line transceiver unit.

9. A device according to claim 8, wherein the receiver includes means for generating the set of measurements by measuring noise which the receiver receives.

* * * * *